May 15, 1962    M. A. DU BOIS    3,034,543
VISCOUS MATERIAL SYSTEM
Filed Dec. 15, 1959    5 Sheets-Sheet 1

INVENTOR
MARVIN A. DUBOIS

ATTORNEY

May 15, 1962

M. A. DU BOIS 3,034,543

VISCOUS MATERIAL SYSTEM

Filed Dec. 15, 1959

INVENTOR
MARVIN A. DUBOIS

BY Harmon, Pierce & King

ATTORNEY

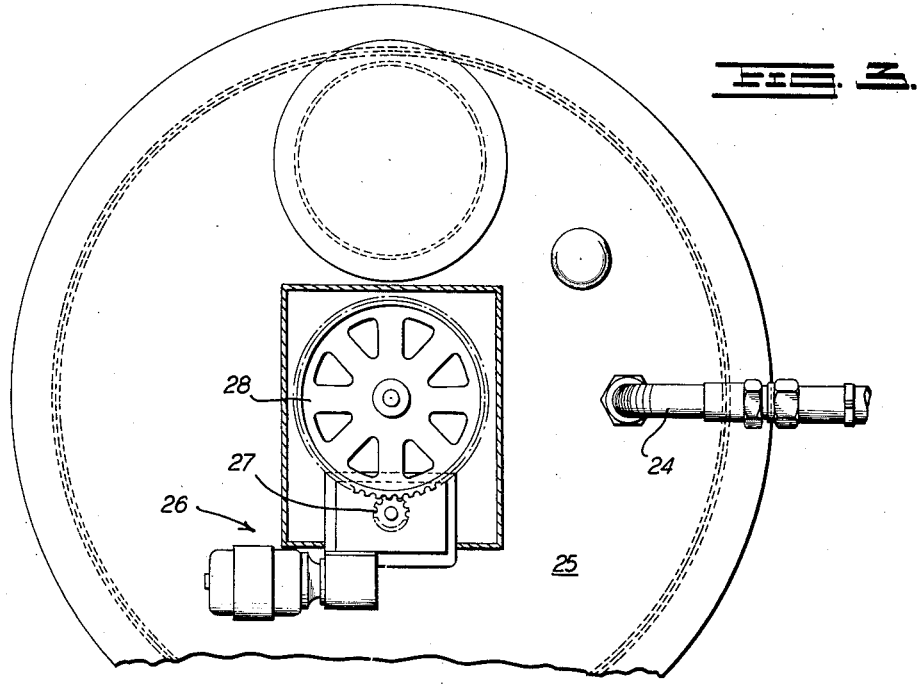
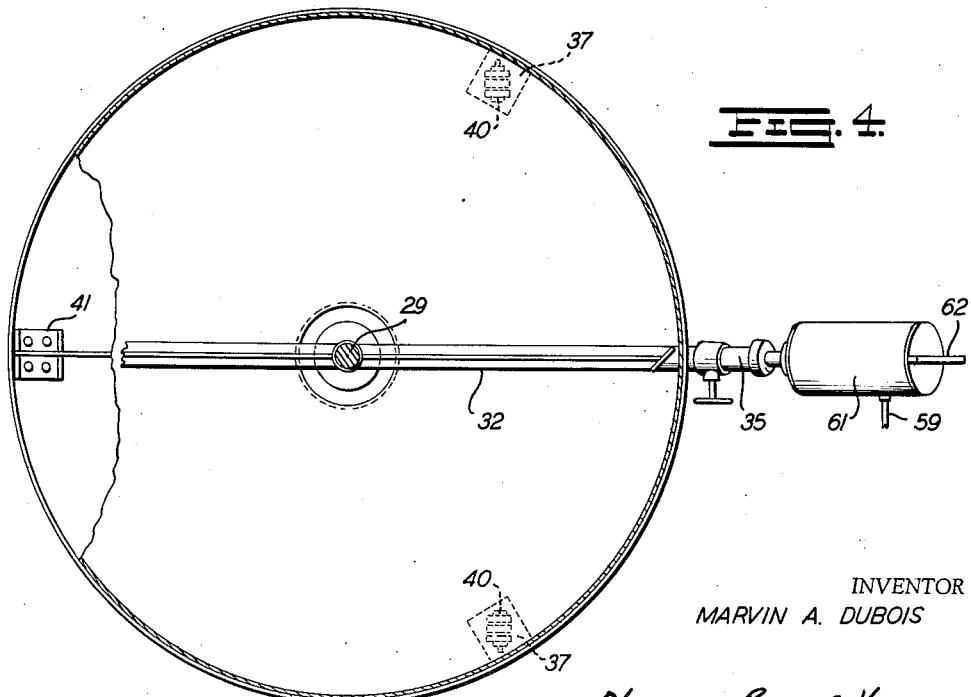

May 15, 1962 M. A. DU BOIS 3,034,543
VISCOUS MATERIAL SYSTEM
Filed Dec. 15, 1959 5 Sheets-Sheet 4
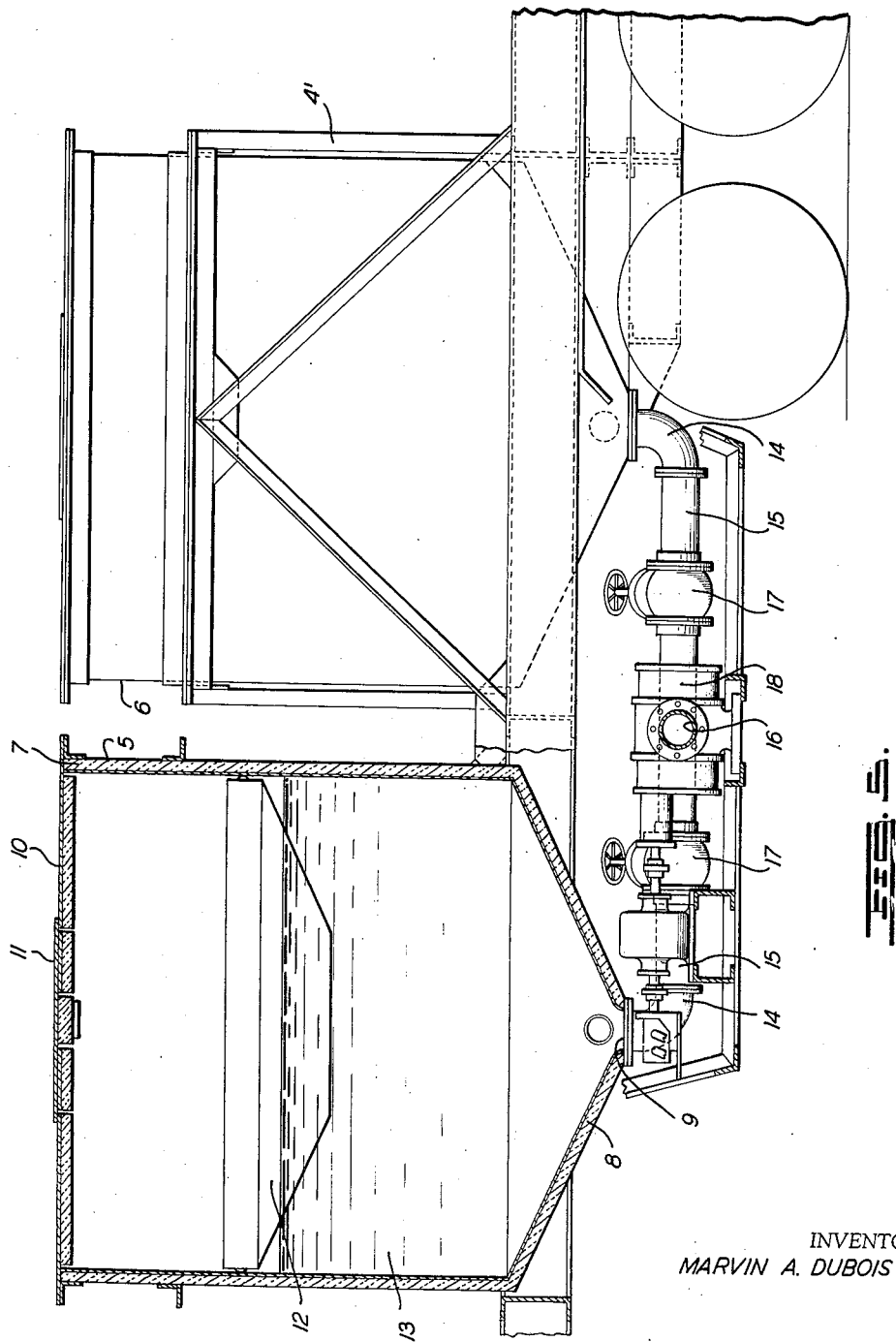
INVENTOR
MARVIN A. DUBOIS
BY
ATTORNEY May 15, 1962

M. A. DU BOIS 3,034,543

VISCOUS MATERIAL SYSTEM

Filed Dec. 15, 1959

INVENTOR
MARVIN A. DUBOIS

BY *Harmon, Pruce + Kurz*

ATTORNEY

3,034,543
VISCOUS MATERIAL SYSTEM
Marvin A. Du Bois, 2600 169th St., Hammond, Ind.
Filed Dec. 15, 1959, Ser. No. 859,711
6 Claims. (Cl. 141—21)

This invention relates generally to viscous material handling systems and more particularly to delivery and storage equipment as well as means for dispensing viscous material from storage equipment.

The primary object of this invention is to provide a simplified means of handling large quantities of viscous material such as grease for large industrial applications.

Another object of this invention is to provide an improved vehicular means for delivery of large quantities of viscous material to stationary storage equipment at industrial sites.

A more specific object of this invention is to provide an improved vehicle construction having suitable effective tank means mounted thereon whereby viscous material such as grease may be readily delivered and dispensed to stationary equipment at industrial sites.

Another object of this invention is to provide an improved storage tank construction for viscous material in large quantities at industrial sites.

A more specific object of this invention is to provide a novel and improved control means for a plurality of storage tanks for viscous material at industrial sites whereby the material is continually agitated to provide means whereby said tanks are readily fillable during a delivery to the tanks by suitable vehicular means.

A further object of this invention is to provide an improved storage tank construction including a weighing device whereby the contents of the tank under filling and dispensing conditions may be gaged.

Another object of this invention is to provide an improved means of dispensing heavy viscous material from large storage tanks in industrial locations.

A still further object of this invention is to provide a large storage tank construction for viscous material whereby a suitable agitator construction within said tank assures a complete dispensing of the material from the tank in an efficient manner.

With the foregoing and other objects in view, this invention resides in the following specification and appended claims, certain embodiments and details of construction of which are illustrated in the accompanying drawings in which:

FIGURE 3 is a top plan view in partial section of the storage tank of FIGURE 2;

FIGURE 4 is a sectioned view taken along the line 4—4 of FIGURE 2;

FIGURE 6 is a schematic diagram of the control system for the various pumps and drive motors associated with the storage tanks illustrated in FIGURE 1.

Figure 1:
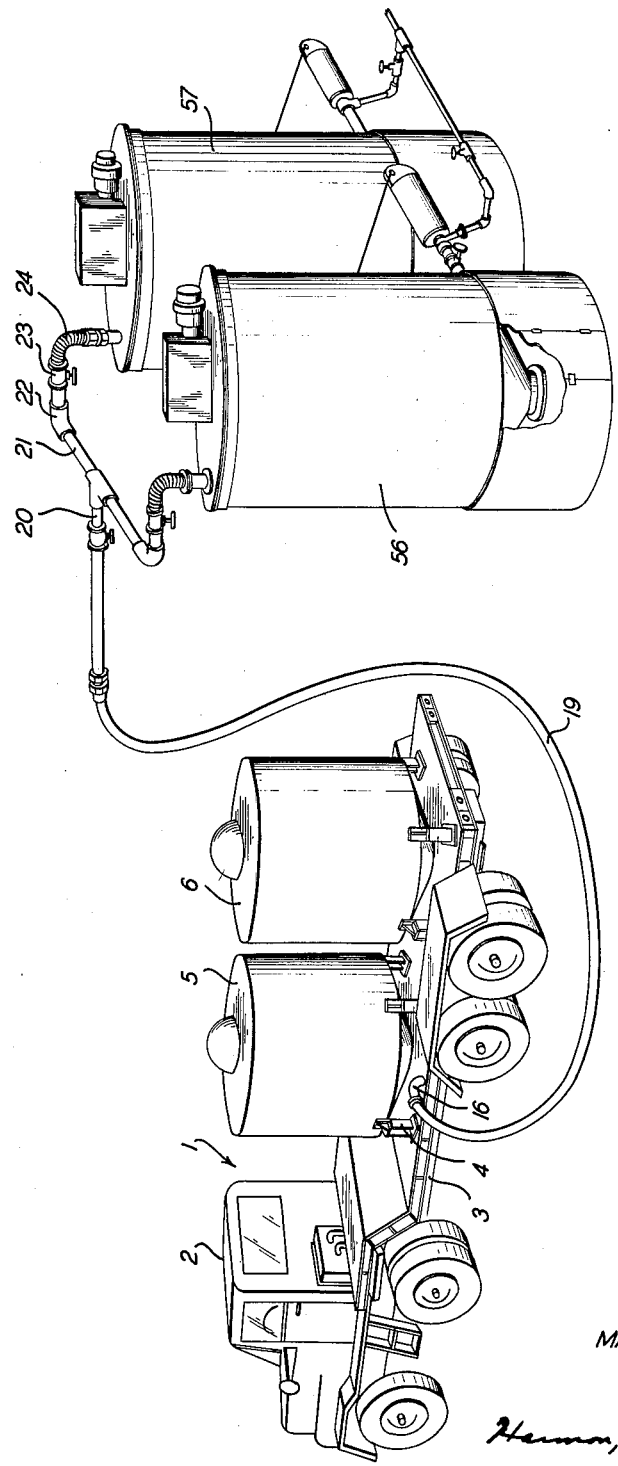
FIGURE 1 illustrates the system of the invention generally with the delivery vehicle interconnected with the stationary storage tank means at an industrial storage and distribution site.
Figure 5:
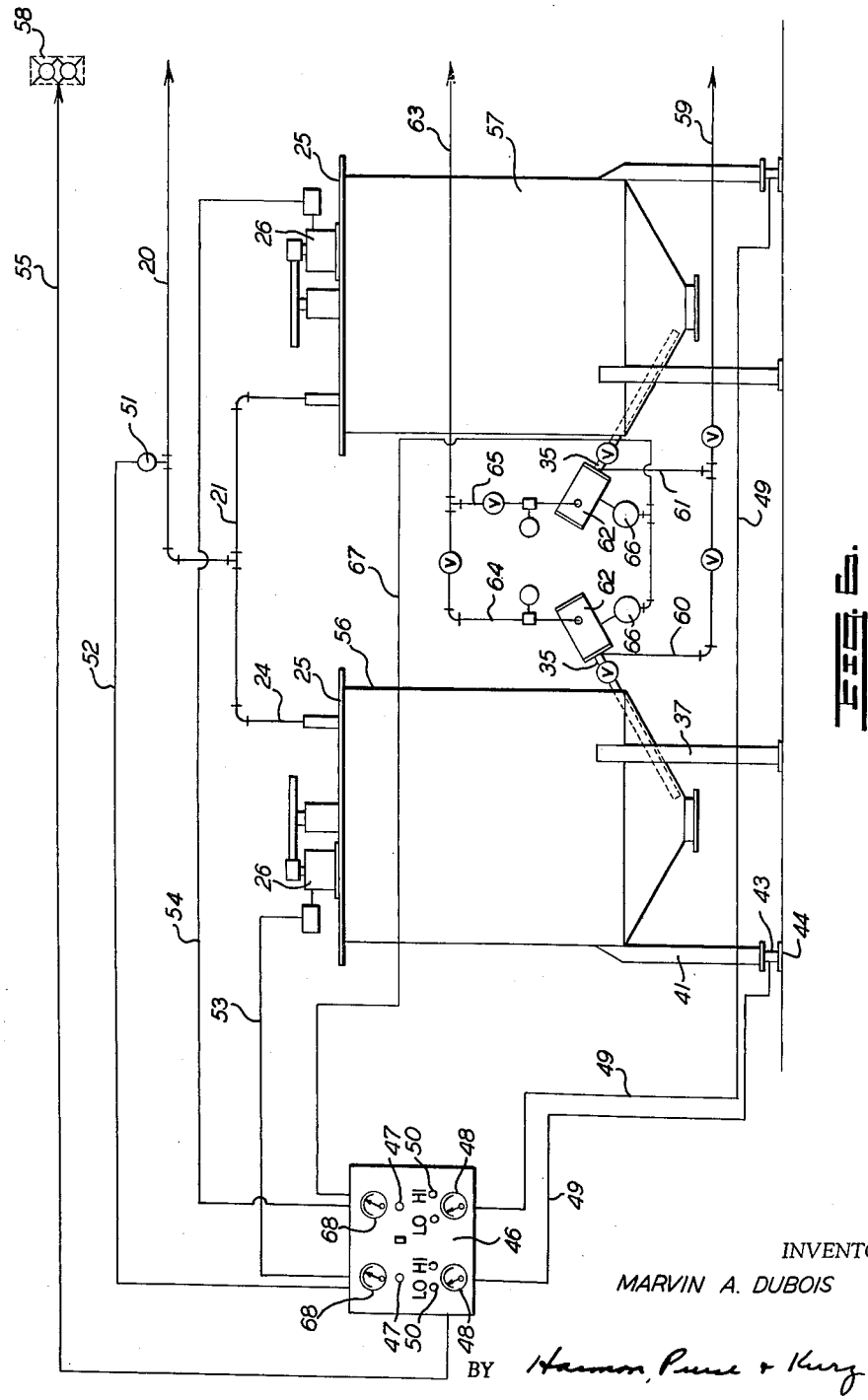
FIGURE 5 is a partially sectioned view of the trailer portion of the vehicle illustrated in FIGURE 1.

Referring now more particularly to FIGURE 1, a vehicle generally indicated at 1 includes the usual cab portion 2 and a semi-trailer portion 3. Suitably mounted on brackets 4 for ready removal from the semi-trailer 3 is a pair of tank units 5 and 6. The tank 6 in FIGURE 5 is supported by a modified bracket or bracing structure 4'. Each tank 5 or 6 includes a generally cylindrical portion 7 terminating in a downwardly directed conical portion 8 leading to an outlet 9. A cover 10 is provided on each tank member. Suitably mounted on the cover 10 is an access door 11 which, as illustrated in FIGURE 5, comprises a unit similar to a manhole cover. Within the tank 5 is freely positioned a weighted float element 12 which rests or floats at all times on the upper surface of the viscous material 13. The float element 12 is heavily weighted to exert a downward pressure at all times upon the material 13 to aid in ejecting or moving the material 13 toward the outlet 9. The outlets 9 of tanks 5 and 6 are interconnected to a general dispensing outlet 16 from the vehicle 1 through a manifolding system which includes tubular fittings 14, pipe connections 15 and valves 17. A pump 18 is provided to forceably eject the viscous material from the manifold outlet 16, and is driven by suitable motive means not illustrated. Obviously with the float element engaging the side walls in a sliding relationship, as the material is ejected by pump 18, a differential pressure will exist on opposite sides of the float, which pressure above said float will assist in its follower action.

Referring again to FIGURE 1, it will be noted that the manifold outlet 16 is connected by suitable means to a flexible conduit or hose 19 which during a delivery operation to industrial storage tanks is connected through a common fitting 20 to a manifold 21. In FIGURE 1, two storage tanks 56 and 57 are illustrated but it is obvious that any reasonable number of tanks may be so interconnected so as to receive viscous material from the conduit 19. The manifold 21 is provided with suitable fittings 22 whereby delivery connections may be made to each tank through valves 23 and piping 24 to the upper end of the subject tank.

Figure 2:
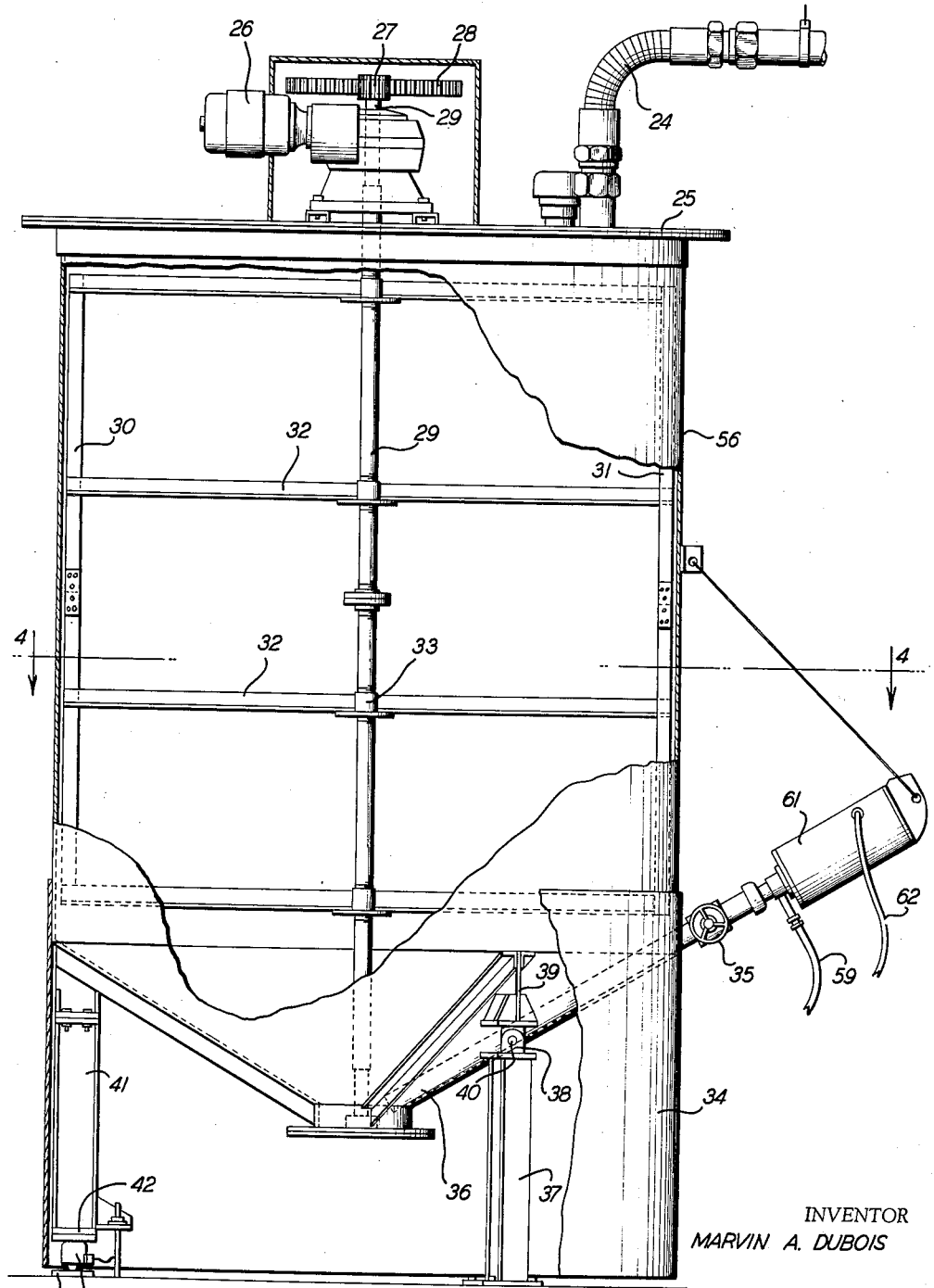
FIGURE 2 is a partially sectioned view in front elevation illustrating the details of one of the storage tank units of FIGURE 1.

Referring now more particularly to FIGURE 2, the tank 56 is illustrated as including a top cover member 25 upon the upper surface of which is mounted a combination drive motor and gear assembly 26. The drive motor and gear assembly 26 is energized from suitable electrical means such as is illustrated in FIGURE 6, to be later described. The drive means 26 includes a pinion 27 which engages the outer periphery of a large gear wheel 28 mounted on the upper end of a drive shaft 29. The drive shaft 29 is suitably mounted in bearing members at either end of the tank 5 and is coaxially arranged with respect to tank 56. It will be obvious therefore that, as the drive assembly 26 is energized, the pinion gear 27 will rotate the shaft 29 through the medium of the driving gear 28.

Interiorly of the tank 56 is mounted a generally rectangular agitator framework which includes a pair of upstanding angled members 30 and 31. Each member 30 and 31 is so arranged within the tanks as to be spaced from, but closely adjacent to, the inner surface wall of the tank. This spacing is achieved by means of a plurality of transverse angle iron bracing members 32. Each brace member 32 is provided with an opening through which extends the driven shaft 29 as illustrated in FIGURE 4. The members 32 are rigidly secured to fitting members 33 which in turn are rigidly secured to the driving shaft. Thus it will become obvious that upon energization of the driving assembly 26, the framework including the members 30 and 31 and the transverse members 32 will be rotated so as to provide a scraper or agitator means for the interior walls of the tank 56 and for the material within the tank generally. Extending through a side wall of the lower supporting structure 34 for the tank 56 is a pump assembly 35. The inner extremity of the tubular draw member 36 for the pump assembly 35 extends into the lower conical portion of the tank 56, wherein viscous material fed downwardly by gravity and by the action of the scraper or agitator assembly may be most efficiently and completely removed by the pump from the interior of the tank 56.

It will be noted in FIGURE 2 that the supporting structure 34 for the tank 56 includes a pair of upstanding supporting pillar members 37, each of which is provided with a pivot bracket 38 to which is connected a downwardly extending pivot arm 39 connected to the lower portion of the tank 56. The members 38 and 39 are interconnected by means of a pivot pin 40. As illustrated in FIGURE 4, two such members 37 with the pivot arrangement just described will permit the tank 56 to be tiltably adjustable in the vertical plane about the pivot pins 40. The purpose of this type of mounting for the tank 56 is to provide a built-in means for the storage tank of determining the delivered or dispensed weight of material to or from said tank. This is achieved through the use of a downwardly directed integral leg member 41 connected to the lower side of tank 56 in an equidistant spaced position relative to the supporting legs 37. The lower extremity 42 of the downwardly extending leg 41 engages upon a suitable well-known load cell element 43 which is mounted on or engages the base or floor structure under the tank 56 as illustrated at 44. By means to be described relative to FIGURE 6, suitable readings taken with regard to indications given by load cell 43 will indicate the amount or weight of grease delivered to or from the tank so that an accurate measure of the quantity may be known at all times.

Referring now more particularly to FIGURE 6, it will be noted that the system includes at the usual industrial site a control panel 46 having suitable manual control switches 47 and weight indicating meters 48, there being one such switch for the agitator drive assembly 26 of each storage tank 56, 57, etc. in the industrial system under consideration. Likewise, there is one weight indicator 48 for each storage tank of the system.

Each weight indicating meter 48 is illustrated as being connected by means of a line 49 to a load cell 43 associated with each of the tanks 56, 57, etc. in the industrial storage tank system. Switch means not illustrated associated with each of the weight indicators 48 is active at two spaced points relative to the meter whereby to illuminate one or the other of a pair of light signal indicators 50, one of which is a low level indicator for the particular associated storage tank and the other of which is a high level or substantially capacity level indicator for said tank. Therefore, the control operator for the system at the industrial site, by noting the signal light indicators 50 associated with each said storage tank 56 or 57, can determine immediately whether or not the tank requires filling, is filled, or is at some position between said two limits.

Interconnected with the incoming line 20 is a pressure actuated switch 51 which is actuated at a suitable pressure level in the line 20 whereby to close circuit means, not illustrated, on the back of said control panel 46 by interconnection through the line 52 to energize the motor assemblies 26 of each tank assembly through suitable interconnecting lines 53 and 54. The arrangement assures that at any time grease or other viscous material is being delivered through the line 20 to the tanks 56 and 57, that the agitator drive assemblies 26 will be energized whereby to rotate the agitator means within said tanks to assist in the full capacity delivery of the viscous material to the interior of said tanks. Interconnected with the panel 46 by means of a dual or multiple conductor line 55 is a light indicator bank 58 preferably positioned remotely from said storage tanks whereby to indicate to the operator of the delivery truck whether or not the storage system is in a filled condition. The lights are so conditioned with regard to the control panel 46 that when said lights are in the "on" condition the operator of the vehicle is appraised of the fact that said tank associated with each said light of the bank 58 is filled to its capacity. The interconnection of the line 55 with the panel 46 is made through means not shown to the high level indicating light associated with each weight indicator 48 for the plural storage tank system. Therefore, when the high indicator light on the panel is lit, its associated external or remote light in the bank 58 will also be illuminated.

The distribution system at the industrial site for the viscous material dispensed from the tanks 56 and 57 includes a general distribution line 59 which is interconnected through lines 60 and 61 to the motor pump assemblies 35 associated with each tank. Each motor pump assembly includes a fluid motor 62 which derives fluid such as air under pressure from a common air pressure line 63 connected to the industrial site air pressure system, not illustrated. The incoming air pressure line 63 is connected by suitable fitting means and individual connector lines 64 and 65 to the individual motors 62 of each pump assembly. Further connected with each motor 62 is a pressure switch 66, each of which is combined or interconnected through a line 67 to the panel board 46. The system as described includes means within the fluid motors 62 which is responsive to drops in viscous material pressure in the line 59 to cause each said motor 62 to function to immediately dispense the viscous material from the lower extremity of said tanks whereby to re-establish the pressure in the line 59. Simultaneously with the energization of said motors, due to said drop in viscous material pressure, the pressure switches 66 actuated by increased air pressure on the motors 62, function to close a circuit to a switching arrangement not illustrated on the back of panel 46 whereby to close a source of power through to said lines 53 and 54 whereby said agitator drive assemblies 26 are energized to drive the agitators during the dispensing operation by said motor pump assemblies 35.

Also positioned on the control panel 46 is a pair of timer indicator dials 68 which, by means not illustrated, may be utilized to periodically operate the agitators of said storage tanks by energizing the drive assemblies whether or not any delivery or dispensing operation is performed. In other words, to prevent the viscous material from settling into a separated state within the tanks, it is desirable to keep the said material in agitated condition so that it is continuously in condition for dispensing from the tank by the motor pump assemblies 35.

Thus it will now be obvious to one skilled in the art that the system of this invention provides for delivering and dispensing viscous material under most favorable conditions. These include the mass bulk truck delivery, the details of which include the float followers on the truck tanks and the dispensing pump, together with the mass bulk storage tanks and the agitators therein, all of which aid in keeping the material mobile and agitated during delivery. The storge tanks through the same agitator means keep the material mobile when distribution is made by pump assemblies 35.

It will become apparent to one skilled in the art that many structural variations of the system are possible, all within the general purview of this inventor and all within the scope of the appended claims.

I claim:

1. A viscous material storage system comprising a plurality of storage tanks having inlets, manifold means interconnecting said inlets to said storage tanks, means to deliver viscous material under pressure to said manifold, means responsive to high back pressure in said manifold system to preclude operation of said means to deliver viscous material to said tanks and to permit operation at low back pressure, agitator means within the confines of each said tank and driven by means external to said tank, means interconnecting said agitator means with said pressure responsive means whereby to avoid operation of said agitator means when pressure in the manifold rises above a certain level but permit operation when below said level, pump means to discharge viscous material from each said tank, second manifold means to receive the discharge from said pump means of said tanks, and fluid means to control the operation of said pump means, said pressure responsive means being interconnected with said fluid means and said pump means whereby to cut off operation of said pump means under conditions whereby said agitator means is in a non-operative condition.

2. A viscous material storage tank comprising inlet means to direct viscous material to the inner confines of said storage tank, control means associated with said directing means, agitator means mounted within the said storage tank, agitator drive means mounted external of said tank and being in driving engagement with said agitator, said drive means being energized upon delivery of viscous material through said directing means by said control means whereby to automatically actuate the agitator means, means to forceably eject viscous material from the confines of said tank, said ejecting means including a fluid drive motor and pump assembly, and pressure responsive control means associated with the fluid motor whereby to automatically energize said agitator drive means during a viscous material dispensing operation, and de-energize said drive means when no material is being dispensed.

3. A viscous material storage tank comprising inlet means to direct viscous material to the inner confines of said storage tank, control means associated with said directing means, agitator means mounted within the said storage tank, said agitator means having means energized upon delivery of viscous material through said directing means by said control means whereby to automatically actuate the agitator means, means to forceably eject viscous material from the confines of said tank, said ejecting means including a fluid drive motor and pump assembly, and pressure responsive control means associated with the fluid motor whereby to automatically energize said agitator means during a viscous material dispensing operation, and de-energize said drive means when no material is being dispensed.

4. A storage tank for viscous material comprising a generally cylindrical tank unit including an upper cover member and a lower integral conical end member terminating in an inverted peak, means to direct viscous material into the upper end of said tank unit, independently powered ejecting means to forceably discharge viscous material from the peak of said lower conical end member, a coaxially disposed drive shaft mounted within said storage tank and extending outwardly of the tank above the cover member, agitator means connected with said drive shaft, and means mounted on the upper cover to forceably engage said drive shaft and impart motion thereto, whereby during a material dispensing operation said agitator will coact with said independently powered ejecting means to deliver material from the tank unit, by moving material downwardly into the lower peak end of the tank.

5. A storage tank for viscous material including an upper end cover member, a lower generally conical end member terminating in a lower inverted peaked portion, a drive shaft, means to rotatably mount the drive shaft coaxially within said storage tank, said drive shaft extending upwardly through the upper cover of said storage tank and being provided at the end portion thereof with a drive pinion, drive gear assembly means inter-engaging with said pinion to impart rotation to said drive shaft, agitator means connected with said drive shaft within said tank whereby to continually agitate said viscous material, means to receive viscous material through the upper cover of said storage tank and to direct said material into the path of movement of said agitator means, pump means mounted within the tank and having an inlet positioned generally at the lower peaked portion of said lower end member for forceably removing said viscous material from the confines of said tank, means to support said tank for pivotal movement, means associated with said supporting means whereby to sense and indicate the amount of viscous material in said storage tank unit at any given time, said supporting means comprising three supporting leg members, two of said leg members being provided with pivot joint connections with said tank and the third said leg member engaging upon said weight sensing means to impart thereto increased pressure or decreased pressure on said weight sensing means about the pivotal interconnection with said other two legs upon increase or decrease of viscous material quantity within said tank unit.

6. A viscous material storage tank comprising means to direct viscous material into the upper, inner confines of said storage tank, an agtitator in said tank including a drive therefor, means to forceably eject viscous material from the confines of said storage tank, a control and indicating panel for controlling the operation of all of the aforesaid means, a transducer responsive to the weight in said tank, said panel including weight indicating means connected with said transducer for remotely indicating the weight in the tank, an indicator connected to said drive, and pressure actuated switch means to preclude delivery of viscous material into said tank unless said agitator drive is operating, and to stop operation of the agitator drive if no material is being directed into the tanks.

References Cited in the file of this patent

UNITED STATES PATENTS

| | | |
|---|---|---|
| 266,157 | Hurt et al. | Oct. 17, 1882 |
| 509,987 | Wilcox | Dec. 5, 1893 |
| 735,281 | Mitchell et al. | Aug. 4, 1903 |
| 1,890,160 | Montgomery | Dec. 6, 1932 |
| 1,956,144 | Brown | Apr. 24, 1934 |
| 2,075,126 | Marden | Mar. 30, 1937 |
| 2,121,972 | Linton | June 28, 1938 |
| 2,506,911 | Zeigler | May 9, 1950 |
| 2,531,305 | Smith | Nov. 21, 1950 |
| 2,557,374 | Cripe | June 19, 1951 |
| 2,752,118 | Haile | June 26, 1956 |
| 2,754,108 | Brown | July 10, 1956 |
| 2,778,387 | Diehl | Jan. 22, 1957 |
| 2,850,052 | Solie | Sept. 2, 1958 |
| 2,877,928 | Ireland | Mar. 17, 1959 |
| 2,984,386 | White | May 16, 1961 |